United States Patent
Miyake et al.

(10) Patent No.: US 7,120,669 B2
(45) Date of Patent: Oct. 10, 2006

(54) ELECTRONIC MAIL SENDING APPARATUS AND METHOD

(75) Inventors: Kiyoshi Miyake, Mobile, AL (US); Haruna Sasakuma, Toyonaka (JP)

(73) Assignee: Minolta Co., Ltd., Osaka (JP)

( * ) Notice: Subject to any disclaimer, the term of this patent is extended or adjusted under 35 U.S.C. 154(b) by 848 days.

(21) Appl. No.: 10/098,452

(22) Filed: Mar. 18, 2002

(65) Prior Publication Data
US 2002/0143883 A1    Oct. 3, 2002

(30) Foreign Application Priority Data
Mar. 29, 2001    (JP) ............................ P2001-095455

(51) Int. Cl.
*G06F 15/16* (2006.01)
(52) U.S. Cl. .................................... 709/206
(58) Field of Classification Search ................ 709/205, 709/206, 226, 229, 246, 247
See application file for complete search history.

(56) References Cited

U.S. PATENT DOCUMENTS

| | | | |
|---|---|---|---|
| 6,172,763 B1 * | 1/2001 | Toyoda et al. | 358/1.15 |
| 6,275,850 B1 * | 8/2001 | Beyda et al. | 709/206 |
| 6,574,670 B1 * | 6/2003 | Eguchi | 709/245 |
| 6,714,971 B1 * | 3/2004 | Motoyama et al. | 709/219 |
| 6,823,365 B1 * | 11/2004 | Mattis et al. | 709/206 |
| 2003/0046421 A1 * | 3/2003 | Horvitz et al. | 709/238 |

FOREIGN PATENT DOCUMENTS

| | | | |
|---|---|---|---|
| JP | A-11-32196 | | 2/1999 |
| JP | A-11-196218 | | 7/1999 |
| JP | 2000029797 A | * | 1/2000 |
| JP | A-2000-29797 | | 1/2000 |
| JP | 2000112842 A | * | 4/2000 |
| JP | 2001007975 A | * | 1/2001 |
| JP | A-2001-14235 | | 1/2001 |

* cited by examiner

*Primary Examiner*—William C. Vaughn, Jr.
*Assistant Examiner*—Yemane M. Gerezgiher
(74) *Attorney, Agent, or Firm*—Buchanan Ingersoll & Rooney PC

(57) ABSTRACT

Disclosed is an apparatus and method for controlling the data size of an electronic mail. A computer program executes the method as follows. A mail controlling section compresses data of an electronic mail so that the data size is not more than an unsendable size recorded in relation to a destination electronic mail address by referring to an address table. A mail sending section sends the compressed electronic mail to a recipient. In the case where an electronic mail that has been received by a mail receiving section has a data size which is larger than a sendable size, an updating section updates the sendable size. Further, in the case where an error mail with regard to an electronic mail which is smaller in data size than the unsendable size is received, the unsendable size is updated.

29 Claims, 11 Drawing Sheets

| ADDRESS NO. | DESTINATION ELECTRONIC MAIL ADDRESS | SENDABLE SIZE | UNSENDABLE SIZE |
|---|---|---|---|
| 1 | abe@abc.com | 1.5 M | 2 M |
| 2 | yama@aaa.com | 1.2 M | 1.5 M |
| 3 | suzuki@cc.com | ⋮ | ⋮ |
| 4 | yamada@aaa.com | 1.0 M | 1.5 M |
| 5 | ito@ee.com | ⋮ | ⋮ |
| ⋮ | ⋮ | ⋮ | ⋮ |

| MESSAGE ID | DESTINATION ELECTRONIC MAIL ADDRESS | SEND SIZE | SEND TIME |
|---|---|---|---|
| 432-J11023 | andou@abc.com | 1.2 M | 14:30 |
| 433-J11034 | panda@aaa.com | 1.4 M | 14:43 |
| ⋮ | suzuki@cc.com | ⋮ | ⋮ |
| 434-J11056 | yamada@aaa.com | 1.2 M | 15:00 |
| ⋮ | ito@ee.com | ⋮ | ⋮ |
| ⋮ | ⋮ | ⋮ | ⋮ |

F I G. 6
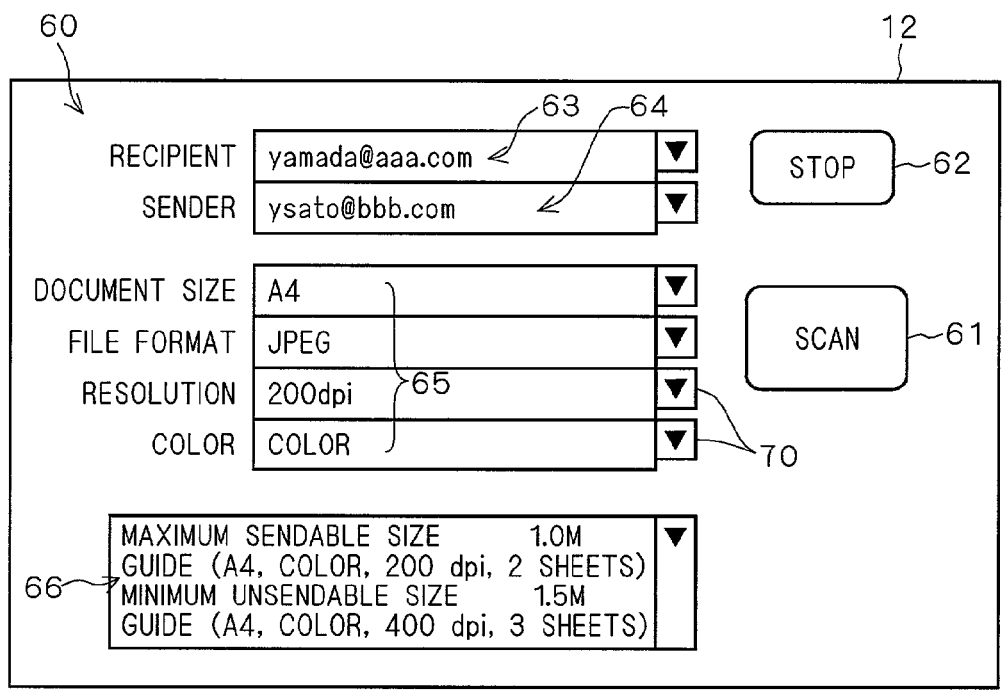

ELECTRONIC MAIL SENDING APPARATUS AND METHOD

This application is based on application No. 2001-095455 filed in Japan, the contents of which are hereby incorporated by reference.

BACKGROUND OF THE INVENTION

1. Field of the Invention

The present invention relates to a technique for controlling a data size of an electronic mail.

2. Description of the Background Art

There has been known an electronic mail software program which operates on a terminal such as personal computer. An electronic mail that a sender sent using electronic mail software is transferred to a mail server of sender side specified in the electronic mail software. The mail server sends the received electronic mail to a mail server of recipient side where a post of a destination electronic mail address exists, in accordance with the destination electronic mail address. Likewise, the recipient receives the electronic mail that has been mailed in his/her own post with the use of electronic mail software operating on a terminal such as personal computer. In this way, the electronic mail system is operated.

In the above system, an electronic mail sent by a sender is transferred by a mail server of sender side. However, since a mail server serves to process electronic mails of a number of users, it provides a limitation for a data size of electronic mail from the view of its throughput or servability.

In view of this, Japanese Patent Application Laid-Open No. 2000-29797 and Japanese Patent Application Laid-Open 2001-14235 disclose techniques in which electronic mail software downloads from a mail server of sender side information regarding a limitation of data size, and cancels sending of electronic mails of data size larger than the limitation.

Furthermore, Japanese Patent Application Laid-Open No. 11-196218(1999) discloses a technique in which an electronic mail having a data size of equal to or more than a specified data size is sent by being divided. Also, Japanese Patent Application Laid-Open No. 11-32196(1999) discloses a technique in which information of data size which is specified for every network type is possessed and a data size of a send mail is limited.

In this way, such a case that a sent electronic mail is rejected by a mail server and sent back as an error mail is avoided.

However, in the techniques disclosed in the above described Japanese Patent Application Laid-Open No. 2000-29797 and Japanese Patent Application Laid-Open No. 2001-14235, only the data size limited by the mail server of sender side is take into consideration, so that if the sent mail is having a size that exceeds a limitation of data size provided by a mail server of recipient side or a relay mail server passed by in transmission path between the mail server of sender side and the mail server of recipient side, the mail will be sent back as an error mail.

In addition, the technique disclosed in Japanese Patent Application Laid-Open No. 11-196218(1999) is premised on the fact that limitation values of data size specified for individual mail servers can be acquired, while the technique disclosed in Japanese Patent Application Laid-Open No. 11-32196(1999) is premised on that limitation values of data size specified for individual network types can be acquired. For this reason, these technique are not applicable when firm limitation values specified for individual mail servers and networks cannot be acquired, and still have a problem that an electronic mail having a relatively large data size is sent back as an error mail.

SUMMARY OF THE INVENTION

The present invention is directed to an apparatus for sending an electronic mail via a network.

According to the present invention, the apparatus comprising: a sending device operable to send an electronic mail; a storing device for storing a relational information representing correlation between data size of respective electronic mails and transmittance results of said respective electronic mails for each mail-designation; an updating device for updating the relational information in response to a mail-sending history of electronic mails; and a controlling device for controlling the sending device in response to the relational information.

Since the mail-sending history of electronic mails is taken into consideration, the judgment whether the new mail would be successfully transmitted to the designation through the network can be well determined before sending the new electronic mail.

Preferably, the relational information includes: an unsendable threshold corresponding to a minimum data size among electronic mails whose transmission have been failed, and a sendable threshold corresponding to a maximum data size among electronic mails whose transmission have been successful.

The judgment is easily and accurately conducted with two threshold values.

In an aspect of the present invention, the controlling device compresses the data of a new electronic mail when a data size of the new electronic mail is larger than the unsendable threshold.

The new electronic mail having the size larger than the unsendable threshold is gated, so that transmission error is prevented.

In a preferred embodiment of the present invention, the controlling device compresses the data of the new electronic mail so that the data size of the new mail after compression is not more than the unsendable threshold.

Through the data compression, the data size of the new electronic mail is automatically reduced to make it possible to send new electronic mail.

In another aspect of the present invention, the controlling device generates a warning when a data size of a new electronic mail is larger than the sendable threshold.

In response to the warning, the user can recognize the situation and try to reduce the electronic mail, for example.

Preferably, the updating device updates the sendable threshold to a data size of a new electronic mail that has been successfully transmitted, when the data size of the new electronic mail is larger than the sendable threshold before updated. Similarly, it is preferred that the updating device updates the unsendable threshold to a data size of a new electronic mail whose transmission has been failed, when the data size of the new electronic mail is smaller than the unsendable threshold before updated.

The respective thresholds are updated in response to the recent history of the mail transmittance.

In a preferred embodiment of the present invention, the updating device updates the sendable threshold in response to a transmittable threshold information included in a transmission error mail which is sent by a mail server.

Using the transmission error mail, reliable information is obtained from the server and is reflected to the threshold.

Preferably, the apparatus further comprises: a displaying device for displaying the relational information for a mail-destination of a new electronic mail in response to designating operation of the mail-destination of the new electronic mail.

The user can easily and previously confirm whether the new electronic mail would be transmitted without errors.

The apparatus may further comprise an image inputting device for inputting an image, and the image may attached to the electronic mail.

Since image data has a large size as compared with mails having a text only, the apparatus according to the present invention is effective for the image mail.

The present invention is also directed to a method and a computer program corresponding to the present apparatus.

In a further another aspect of the present invention, an apparatus for sending an electric mail comprises a mail sending module operable to send an electronic mail; and a controller operable to find a new electronic mail having data size larger than a threshold size, wherein the threshold size is updated in response to transmission results of electric mails having been sent from the mail sending module.

The controller may be operable to gate the new electronic mail having the data size larger than the threshold size, or the controller may be operable to compress the data size of the new electronic mail. Further, the controller is operable to generate a warning for the new electronic mail having the data size larger than the threshold size.

In a preferred embodiment of the present invention, the controller comprises a storage storing a value representing the threshold size, an error process module operable to conduct a predetermined error action when the data size of the new electronic mail is larger than the threshold size, and an updating module capable of updating the threshold size in response to the transmission results.

Therefore, it is an object of the present invention to reduce the possibility of occurrence of transmission error by limiting a data size of electronic mail even in the case where a limitation value of data size cannot be clearly acquired, as well as taking limitations of data size of a mail server of sender side, a mail server of recipient side and a relay mail server into consideration.

These and other objects, features, aspects and advantages of the present invention will become more apparent from the following detailed description of the present invention when taken in conjugation with the accompanying drawings.

BRIEF DESCRIPTION OF THE DRAWINGS

FIG. 4 is a view showing one example of a record recorded in an address table;

FIG. 5 is a view showing one example of a record recorded in a memory table;

FIG. 6 is a view showing an example of panel display;

DESCRIPTION OF THE PREFERRED EMBODIMENTS

Figure 1:
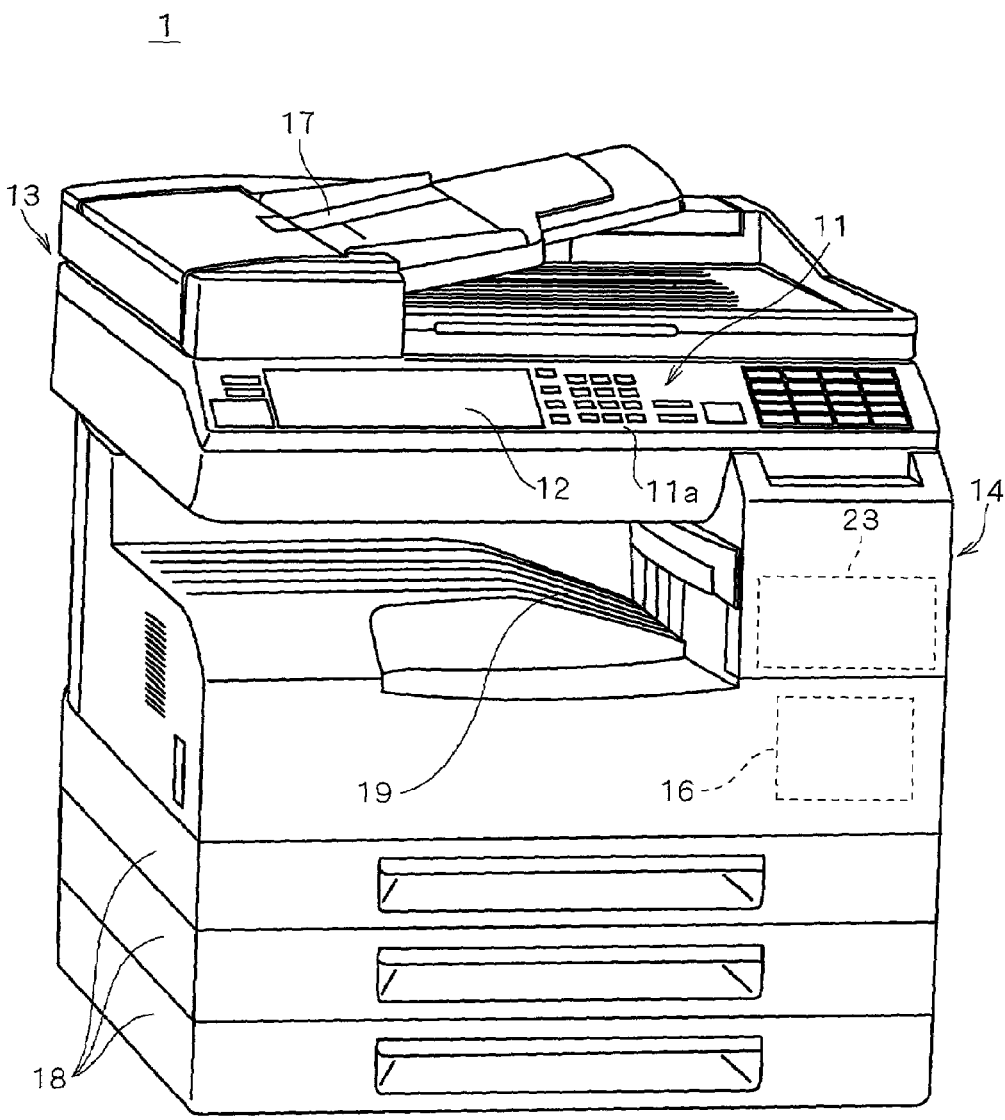
FIG. 1 is a view showing a schematic perspective view of a MFP according to the present preferred embodiment.

In the following, preferred embodiments of the present invention will be explained while referring to the drawings.

(1. General Configuration of MFP)

FIG. 1 is an appearance of a multi function peripheral 1 (hereinafter, abbreviated as "MFP") serving as a data sending apparatus in the present preferred embodiment. The MFP 1 is a combined machine having functions of a scanner, a copying machine, a printer, a facsimile and the like, and can send and receive data via a network.

As shown in FIG. 1, the MFP 1 has an operational section 11 which receives a variety of operational instructions and data inputs of such as characters and numbers made to the MFP 1. The operational section 11 has a plurality of operational keys 11a.

Further, the MFP 1 has a display section 12 for displaying information and the like with regard to operational menus or acquired images. The display section 12 is a touch-panel type display, and in addition to displaying an operational menu or the like, it receives operational instructions to the MFP 1 by detecting a contact operation made on displayed images of operational buttons.

The MFP 1 also has a scanner section 13 for photo electrically reading a document to obtain image data, and a printer section 14 for printing an image on a recording sheet based on the image data.

The MFP 1 also has a feeder section 17 for feeding a document to the scanner section 13 on the top surface of the main body, a sheet supply section 18 for supplying the printer section 14 with a recording sheet in the lower part, a tray 19 to which a recording sheet on which an image has been printed by means of the printer section 14 is to be discharged in the center part, and a communication section 16 for sending/receiving image data and the like to/from external devices via a network and a storage section 23 for storing image data and the like in the interior.

Furthermore, the MFP 1 has a network interface (network I/F) 25 (see FIG. 2), and the communication section 16 is connected with a network via the network I/F 25 so as to be capable of sending/receiving various data to/from external devices.

While the display section 12 is used for displaying various displays including a list display of recipients of data sending, the operational section 11 is used for enabling various inputs including selection of send destination by a user, and these sections function as an essential part of the user interface.

The scanner section 13 photo electrically reads image information of such as photographs, characters and pictures from a document to acquire image data. Acquired image data (density data) is converted into digital data in an image processing section 26 (see FIG. 2), and after being subjected to a variety of well-known image processings, the resultant data is sent to the printer section 14 or the communication section 16 to be subjected to image printing or data sending, or alternatively stored into the storage section 23 for used later.

The printer section 14 prints an image on a recording sheet based on image data acquired by the scanner section 13, image data received from external devices by the communication section 16 or image data stored in the storage section 23.

In addition to sending/receiving facsimile data via public telephone lines, the communication section 16 sends/receives data using an electronic mail or the like to/from external devices connected to networks such as LAN and the INTERNET via the networks. Accordingly, the MFP 1 has not only a function of a facsimile apparatus performing usual facsimile communication but also a function of a sending/receiving terminal of electronic mail. Therefore, as an attached file of an electronic mail, various image data can be sent/received. The network communication conducted by the MFP 1 may be either wire communication or radio communication, and in the illustrated example, communication system according to wire communication is adopted.

Figure 2:
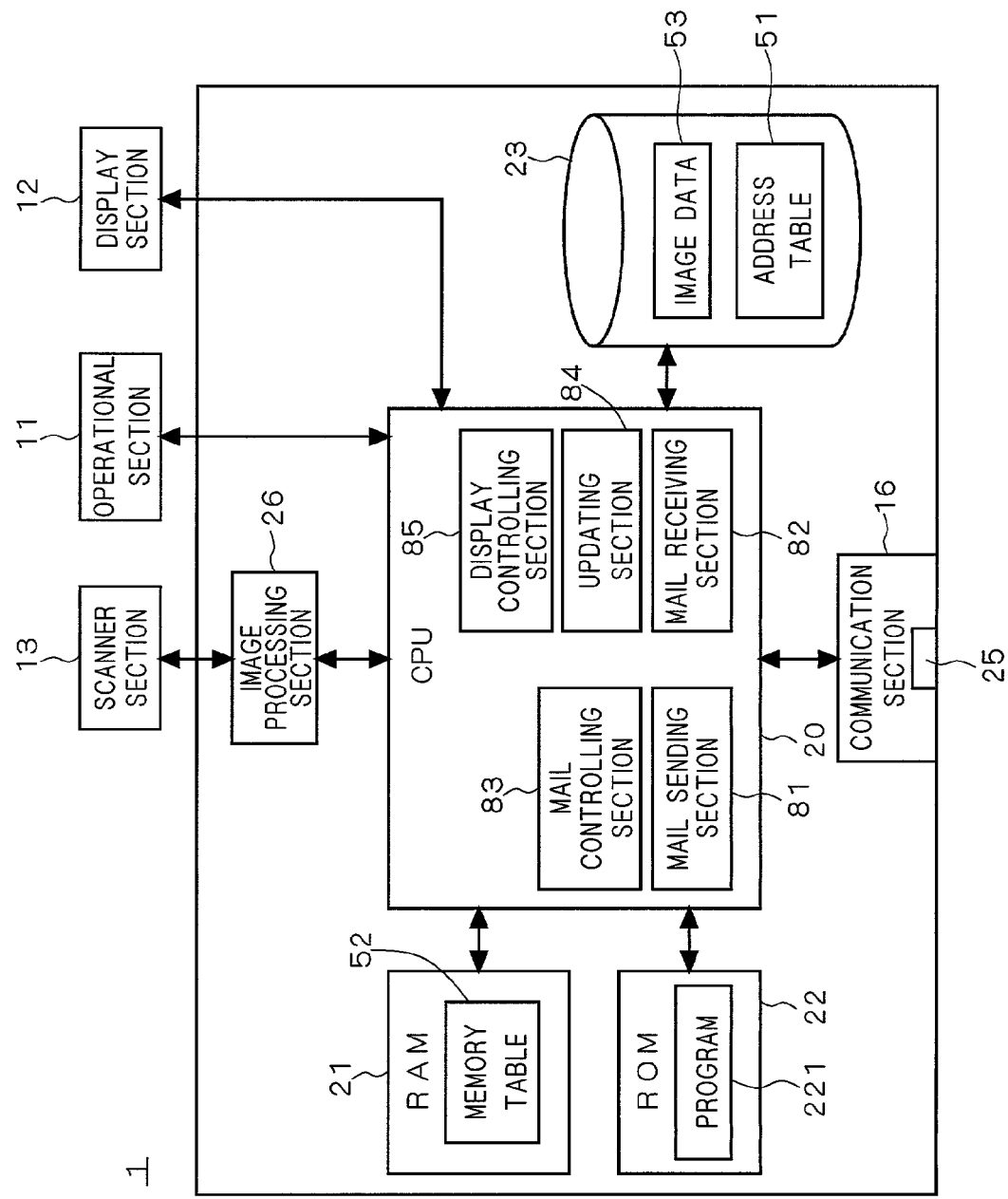
FIG. 2 is a general schematic view of a mail system.

FIG. 2 is a block diagram showing a principal functional configuration of the MFP 1 according to the present preferred embodiment. The MFP 1 has a CPU 20 which performs a variety of operational processes and controls the general operation of the MFP 1, to which a RAM 21 for storing various data and a ROM 22 for storing a program 221 are connected. Furthermore, also the operational section 11, the display section 12, the scanner section 13 and the storage section 23 are connected to the CPU 20. The storage section 23 is configured by a hard disk for storing image data and the like. The RAM 21 is a nonvolatile RAM.

This configuration enables delivery of various data between the RAM 21, the scanner section 13 and the storage section 23 under the control of the CPU 20, and on the display section 12, information stored in the RAM 21 and the storage section 23 is displayed by the control of the CPU 20.

Furthermore, also the communication section 16 for sending/receiving data to/from external devices connected via networks is connected to the CPU 20.

(2. Electronic Mail System)

Figure 3:
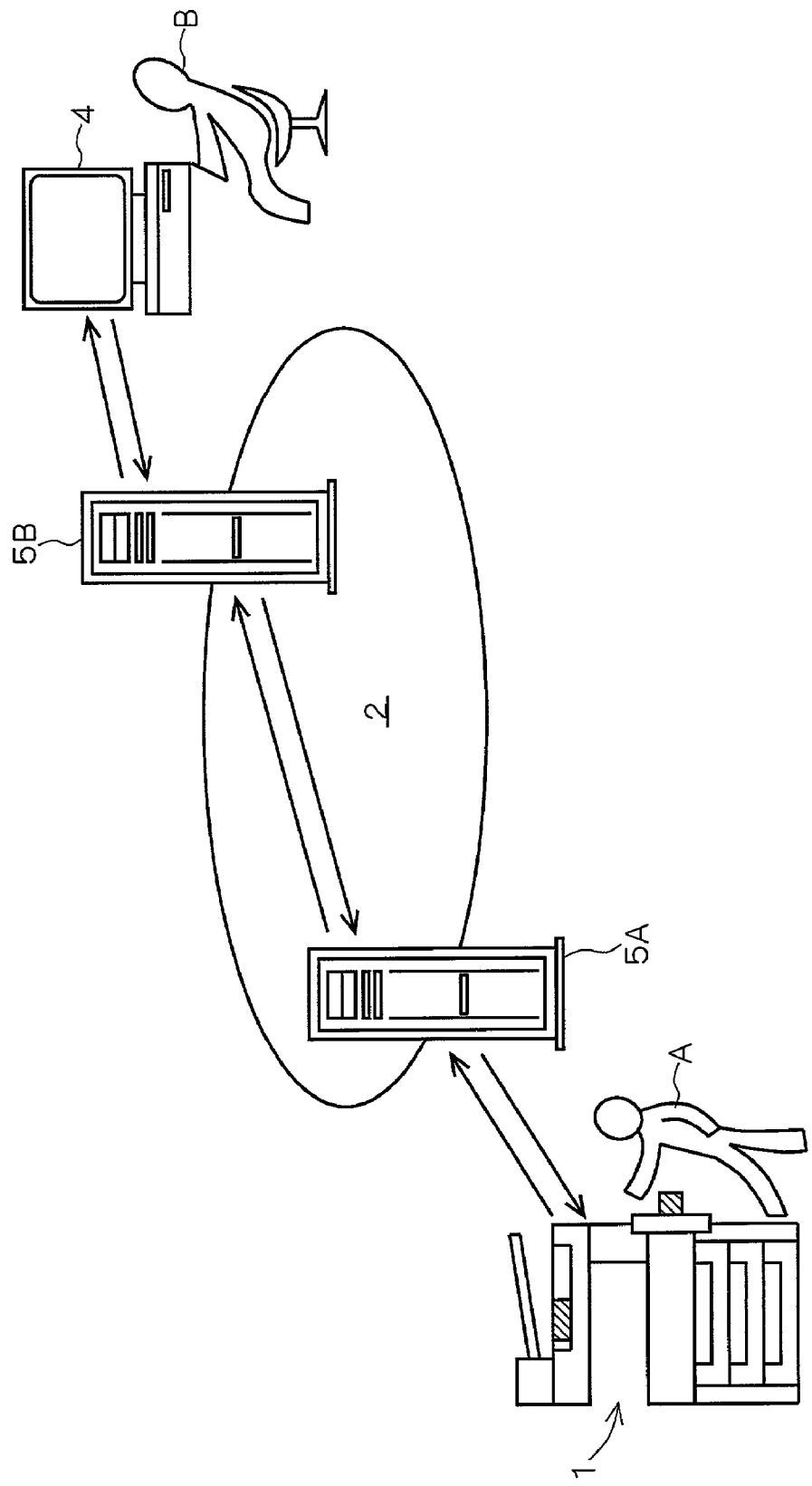
FIG. 3 is an internal configuration view of the MFP according to the present preferred embodiment, and mainly a view showing a functional block regarding mail sending control.

FIG. 3 is a view showing a general configuration of a mail system in which the MFP 1 according to the present preferred embodiment serves as a mail client.

This mail system is a system for sending/receiving electronic mails between the MFP 1 serving as a mail client, and a terminal 4 which is a mail client of the other end. An electronic mail sent from the MFP 1 which is a mail client is processed by a mail server 5A, and an electronic mail sent from the terminal 4 is processed by a mail server 5B.

There are possibilities that mail client and its mail server exist in the same area and in different areas. In the case where these exist in the same area, the mail client and its mail server are connected by, for example, a LAN. And, the mail server is connected to a wide area network 2 such as the INTERNET via a leased line or a public telephone line to achieve sending/receiving of electronic mail with other mail servers.

In the case where the mail client and its mail server exist in different areas, the mail client and the mail server are connected via a leased line, a public telephone line, etc. Then, the mail server achieves sending/receiving of electronic mail with other mail servers via the wide area network 2 such as the INTERNET.

Now, explanation will be made while taking the case where an electronic mail is sent/received between a sender A who sends an electronic mail using the MFP 1 and a recipient B who receives an electronic mail using the terminal 4 as an example. Electronic mail addresses of the sender A and the recipient B are AX and BX, respectively.

The sender A sends an electronic mail directed to the recipient B by making a predetermined operation on the MFP 1. The mail server 5A makes a transmission control in accordance with the electronic mail address BX of the recipient B by the SMTP (simple mail transfer control), whereby the electronic mail sent from the MFP 1 is transmitted to the mail server 5B where a mail post corresponding to the electronic mail address BX exists. The mail server 5B stores the electronic mail from the sender A in the mail post of the electronic mail address BX. Then, the recipient B operates a mail client program which operates on the terminal 4 at a desired timing, and downloads the electronic mail onto the terminal 4 using the POP (post office protocol).

Contrarily, when the recipient B sends an electronic mail to the sender A from the terminal 4, the electronic mail is stored in a mail post corresponding to the electronic mail address AX of the mail server 5A via the mail server 5B. Then, the mail client program of the MFP 1 acquires the mail directed to the user A from the mail server 5A using the POP. In FIG. 3, only the mail server 5A and the mail server 5B are illustrated, however, also there is a possibility that one or more mail server(s) which relay(s) the electronic mail (hereinafter, referred to as "relay mail server") exist(s) in the transmission passage of the electronic mail.

Deliver of electronic mail between the MFP 1 and the terminal 4 is realized in the manner as described above, however, it is common that a certain limitation or an allowable range is provided for data size of electronic mail. This largely attributes to the throughput and disk capacity of the mail server 5A, 5B or the relay mail server. Additionally, since an electronic mail is transmitted via the wide area network 2 which is commonly used by the public, it is meaningful to limit the data size of electronic mail in the sense of morals in utilizing the network.

In view of the above, in most instances, when each mail server or network node receives an electronic mail of a size larger than a threshold data size, it sends back an error mail to the electronic mail address of the sender A without transferring the received electronic mail to the recipient B. In this manner, each mail server or network node provides a limitation for data size of electronic mail, and in the MFP 1 according to the present preferred embodiment takes advantage of such information about limitation of data size more effectively as will be described below.

(3. Sendable Size and Unsendable Size)

As shown in FIG. 2, the storage section 23 of the MFP 1 stores an address table 51. The address table 51 is a table in which destination electronic mail addresses are registered. Each record in the address table 51 includes four items "address No.", "destination electronic mail address", "sendable size" and "unsendable size", the address table 51 serving as relational information representing the correlation between the data size of electronic mails and respective results of transmission.

"Address No." is a serial number assigned to each record.

"Destination electronic mail address" is an electronic mail address of a registered recipient.

"Sendable size" is the maximum data size of electronic mail up to which an electronic mail can be sent with respect to that destination electronic mail address.

"Unsendable size" is the minimum data size of electronic mail below which an electronic mail cannot be sent with respect to that destination electronic mail address.

A method for determining a sendable size will be explained. As mentioned above, the mail servers 5A, 5B, or a relay mail server which relay an electronic mail provide limitations for data size of electronic mail. Therefore, in the case where an electronic mail is successfully sent or successfully received, it can be determined that the data size of the sent (received) mail has passed the limitations of all the mail servers that the electronic mail passed in the transmission passage between the MFP 1 and the terminal 4. Therefore, the data size of the successfully sent (received) electronic mail is recorded as a sendable size corresponding to the recipient (sender) of that electronic mail.

Then, if an electronic mail of the size which is larger than the already recorded sendable size is successfully sent (received), the sendable size is updated. Each destination electronic mail address has this sendable size. This is because mail servers that an electronic mail passes through differ depending on the destination electronic mail address. Therefore, as shown in the drawing, a sendable size is recorded for each destination electronic mail address.

The sendable sizes thus recorded are data which serves as a guide for the sender A of electronic mail in sending an electronic mail. Though there is a possibility that an electronic mail which is larger in size than the recorded sendable size can be sent left, at least, the sender A can judges that an electronic mail which is smaller in size than the sendable size can securely be sent to the recipient.

A method for determining an unsendable size will be explained. As described above, each of the mail servers 5A, 5B or a relay server (a network node in general) which relay an electronic mail provides a limitation for data size of electronic mail, and sends back an error mail to the sender A for an electronic mail which exceeds this limitation for data size. Therefore, if an error mail is received, the MFP 1 can determine that the data size of the sent mail cannot pass the limitation of either of the mail servers that the electronic mail has passed in the transmission passage between the MFP 1 and the terminal 4. Therefore, the data size of the electronic mail that failed to be sent is recorded as an unsendable size corresponding to the destination of that electronic mail. And, if an electronic mail which is smaller in data size than the already recorded unsendable size fails to be sent, the unsendable size is updated. In the same manner as the case of the sendable size, this unsendable size exists for each destination electronic mail address, and an unsendable size is recorded for each destination electronic mail address.

In this manner, the recorded unsendable size is data which will be a guide for the sender A of electronic mail in sending an electronic mail. Though there is a possibility left that even an electronic mail which is smaller in data size than the recorded unsendable size will fail to be sent, at least, the sender A can avoid sending an electronic mail having a data size exceeding the unsendable size. Accordingly, it is possible to avoid operational waste of failing to send an electronic mail and resending the electronic mail. Furthermore, in view of the entire mail system, it is possible to prevent an electronic mail of such a large data size that cannot succeed in being sent from flowing into the network.

In the drawing, the record of address No. 1 has a registration of an electronic mail address of "abe@abc.com", and a sendable size and an unsendable size of send mail to this recipient are recorded as 1.5 MB and 2 MB, respectively. That is, with regard to the destination electronic mail address "abe@abc.com", there is information that an electronic mail having a data size of 1.5 MB or less can be securely sent, and an electronic mail having a data size of 2 MB or more cannot be sent.

FIG. 6 is a view showing the state that information with regard to the destination electronic mail address "yamada@aaa.com" registered as the address No. 4 in FIG. 4 is displayed on the display section 12.

On the display section 12, a menu screen 60 for sending an electronic mail attached with a scanning image is displayed. The display section 12 is a touch-panel type display, and images of a scan button 61 and a stop button 62 are displayed in the menu screen 60, which images are touched by a finger so as to make an operational instruction.

Furthermore, in the menu screen 60, an input field into which various information is to be inputted. In a destination input field 63 and in a sender input field 64, electronic mail addresses of a recipient and a sender are inputted, respectively. Furthermore, in a setting information input field 65, setting information of document size, file format, resolution and color is inputted.

Inputs to these input fields can be made by using pull-down buttons 70 displayed on the ends of the input fields. A finger touches on the pull-down button 70, a pull-down menu is displayed on the menu screen 60, and a list of information registered as information to be inputted into each input field is displayed. Then, by touching desired information from the displayed list of information, the information is displayed in the input field and selected. For example, if a pull-down button 70 in the destination input field 63 is touched, a list of destination electronic mail addresses registered in the address table 51 is displayed.

An input to these input fields is carried out by either of selecting information displayed in the pull-down menu or directly inputting characters in the operational section 11.

Then, in a size information display field 66, size information (sendable information and unsendable information) of electronic mail with regard to yamada@aaa.com which is the destination electronic mail address is displayed. In the size information display field 66, in addition to the sendable size and the unsendable size registered in the address table 51, information which will be a guide in scanning is displayed. For example, in the case where the sendable size is 1.0 MB, the fact that image data corresponding to two A4-size sheets of color image scanned at 200 dpi can be sent as an attachment file is displayed as guide information.

FIG. 5 is a view showing the contents of a memory table 52 stored in the RAM 21. The memory table 52 is a table in which history information of electronic mails that have been sent, and is used as data for determining the above-described sendable size and unsendable size.

The memory table 52 includes four items: "message ID", "destination electronic mail address", "send size" and "send time".

"Message ID" is an ID assigned uniquely to an electronic mail that has been sent.

"Destination electronic mail address" is an electronic mail address of a recipient of that send mail.

"Send size" is a data size of that send mail. In the case where the send mail includes an attachment file, a data size of this attachment file is also included in the data size.

"Send time" is a time when the electronic mail was sent. In the drawing, only hour and minute are shown, data regarding year, month and day are also possessed internally.

(4. Process Flow)

Next, a function and a process flow of a program for controlling data size of electronic mail will be explained.

First, with reference to FIG. 2, a functional configuration of the processing program will be explained. The program 221 stored in the ROM 22 has a function of a mail client program as a basic function, as well as functions specific to the present preferred embodiment.

Functions that are implemented by the CPU 20 to operate in accordance with the program 221 while using the hardware resources such as RAM 21 and storage section 23 are illustrated as a mail sending section 81, a mail receiving section 82, a mail controlling section 83, an updating section 84 and a display controlling section 85.

The mail sending section 81 includes a function of adding image data 53 etc. to a send mail as an attachment file or the like function, as well as a function of sending a send mail for which a destination electronic mail address has been designated to the mail server 5A.

The mail receiving section 82 includes a function of acquiring a data size of a received electronic mail or the like function, as well as a function of executing an electronic mail receiving process with respect to the mail server 5A in accordance with the POP.

The mail controlling section 83 has functions of compressing an attachment file on the basis of the unsendable size recorded in the address table 51, and of displaying a warning message.

The updating section 84 has a function of executing update process of the address table 51 on the basis of the memory table 52, a data size of a received mail and the like.

<4-1. Main Process to Sending Process>

Figure 7:
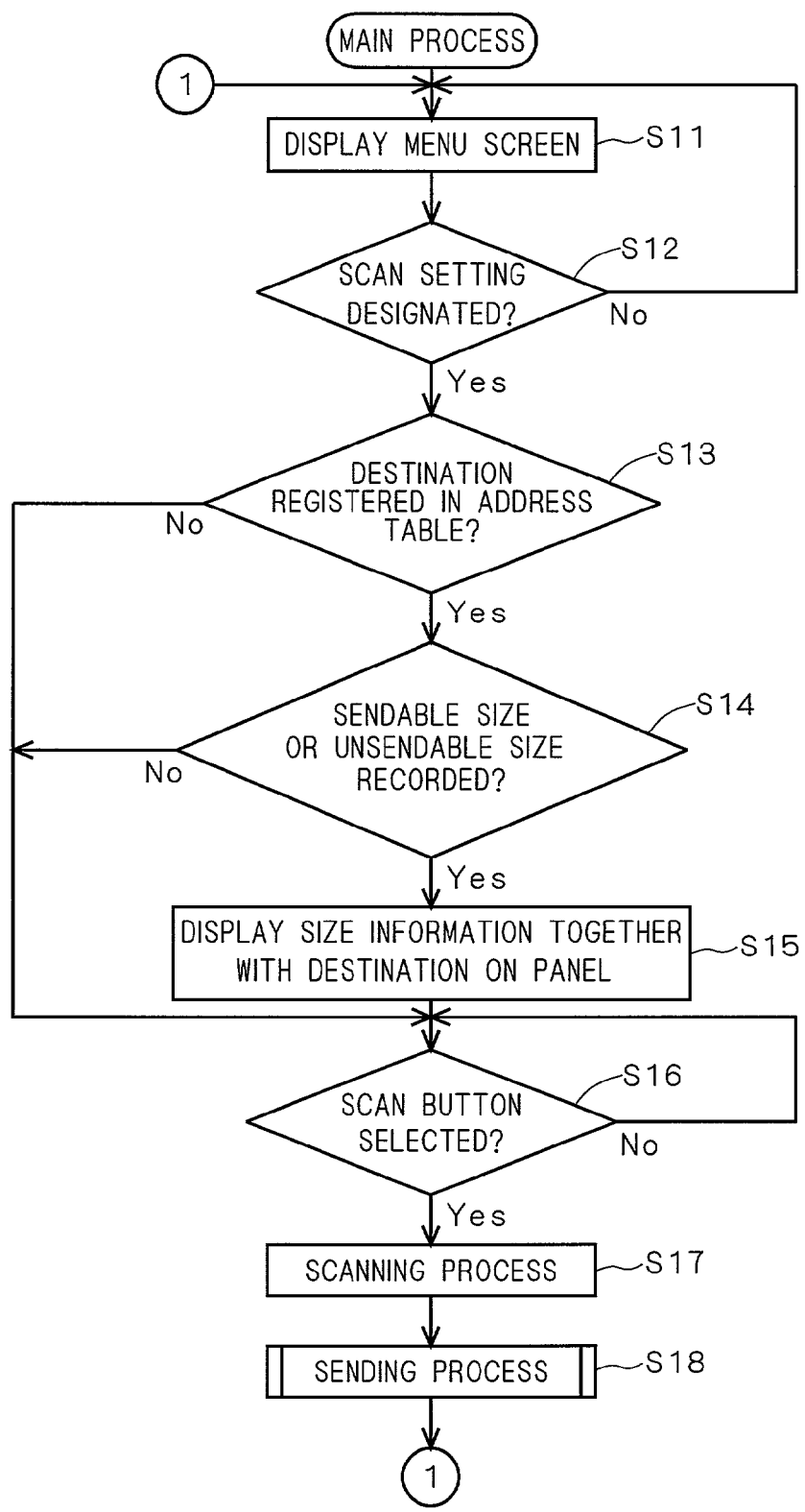
FIG. 7 is a flow chart of a main process.

FIG. 7 is a flow chart of a main process. The MFP 1 is turned on, and the program 211 starts up. Then, the display controlling section 85 controls the display section 12 to display the menu screen 60 (illustrated in FIG. 6) (step S11). At this time, the sender A makes a setting operation of scanning, in other words, makes an input operation to the input form 63, 64, 65 (step S12), and the mail controlling section 83 determines whether or not the destination electronic mail address inputted to the destination input field 63 is registered in the address table 51 (step S13). In the case where the destination electronic mail address is not registered in the address table 51 ("No" in step S13), the flow comes into a state of waiting a selecting designation by the scan button 61 (step S16).

In the case where the destination electronic mail address is registered in the address table 51 ("Yes" in step S13), the mail controlling section 83 determines whether or not a sendable size or an unsendable size with regard to that destination electronic mail address is registered in the address table 51 (step S14).

In the case where a sendable size or an unsendable size with regard to that destination electronic mail address is not registered ("No" in step S14), the flow comes into a state of waiting a selecting designation by the scan button 61 (step S16).

In the case where a sendable size or an unsendable size with regard to that destination electronic mail address is registered ("YES" in step S14), the display controlling section 85 displays a sendable size, an unsendable size and guide information on the size information display field 66, as shown in FIG. 6.

The sender A of the electronic mail can complete the mail sending operation smoothly by referring to the size information displayed in the size information display field 66.

The most reliable way is to make the data size of the send mail smaller than the sendable size. This is because it has already found that an electronic mail which is smaller in data size than the sendable size can be securely sent to the recipient B displayed in the destination field 63 (in this context, the electronic mail address of the recipient B is "yamada@aaa.com"). Therefore, as shown in FIG. 6, the sender A can find that a data size corresponding to two sheets of A4 color document scanned in 200 dpi may be sent securely.

Though the reliability is deteriorated compared to the above-mentioned way, there is another way in which the data size of the send mail is made larger than the sendable size and smaller than the unsendable size. In this case, since the data size of the send mail is larger than the sendable size, it is impossible to ensure that the sending succeeds. However, in the case where the data size of the send mail is smaller than the unsendable size, it is valuable to make challenge because there is a possibility that the sending will succeed. This is an effective way, especially in the case where there is a large number of document and it is desired to attach as many document as possible in one mail sending. Also in this case, by making the data size smaller than the unsendable size, the same failure made in past will not be made again, so that the operational efficiency is improved. For example, as shown in FIG. 6, it can be found that if three sheets of A4 color document is sent in 400 dpi, the data size can be made smaller than the unsendable size.

If the sender A makes a selecting designation with the scan button 61 in the condition that the size information is displayed on the display section 12 in the manner as described above ("Yes" in step S16), a document scanning process is executed by the scanner section 13 in accordance with the scan condition inputted to the setting information input field 65 (step S17), and after a predetermined image processing is made in the image processing section 26, the image data 53 is stored in the storage section 23. After completion of the scanning process, a sending process starts (step S18).

Figure 8:
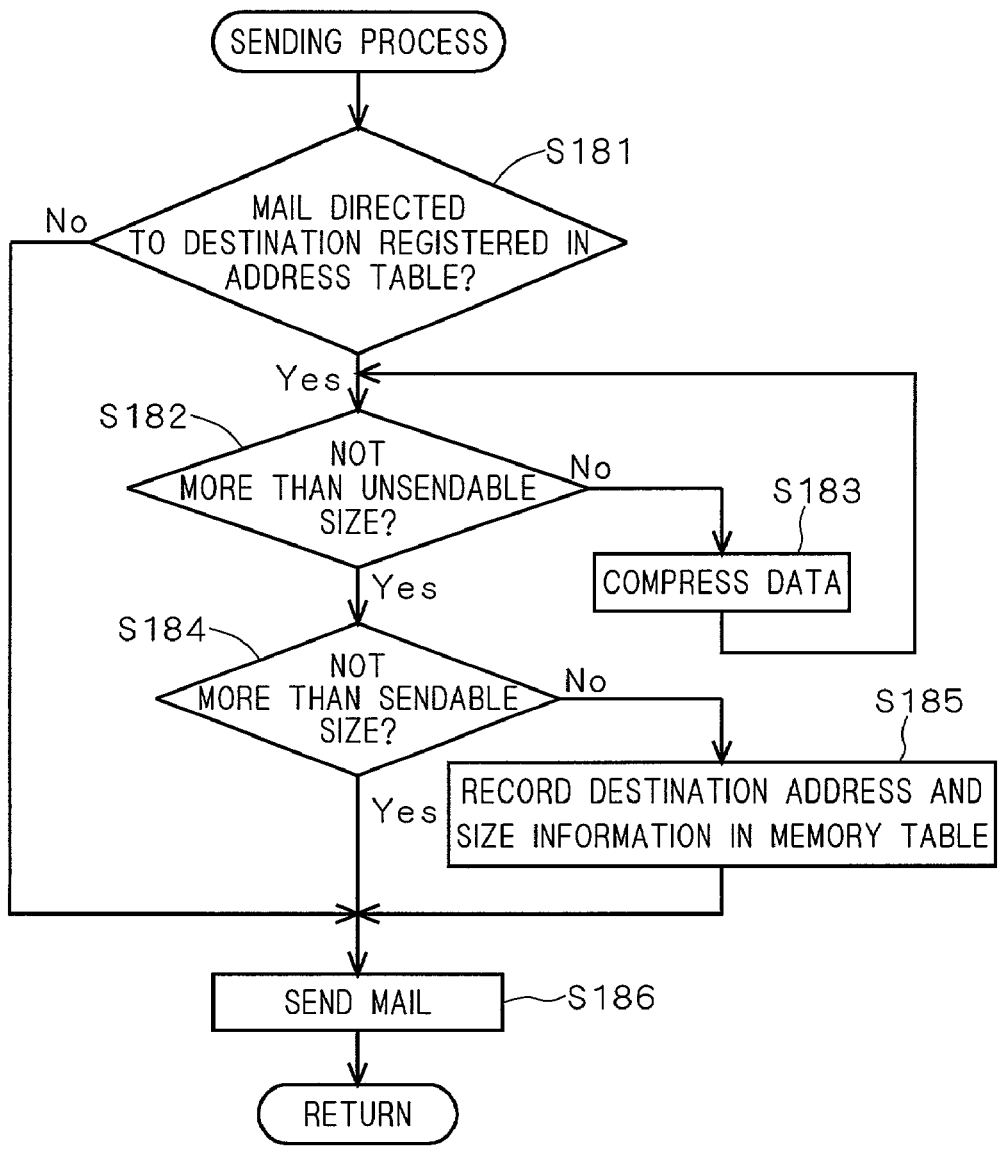
FIG. 8 is a flow chart of a sending process.

FIG. 8 is a flow chart of a sending process.

The mail controlling section 83 determines whether or not the recipient of the send mail is a recipient registered in the address table 52 (step S181). In the case where the recipient is not registered ("No" in step S181), the image data 53 is attached to the send mail without being compressed and the electronic mail is sent (step S186).

In the case where the recipient is registered in the address table 52 ("Yes" in step S181), the mail controlling section 83 calculates a data size of the send mail including the image data 53 as an attachment file with reference to the address table 51, and determines whether or not the data size is not more than the unsendable size (step S182).

In the case where the data size of the send mail is larger than the unsendable size ("No" in step S182), the attachment file (image data) is compressed (step S183). With regard to this, compressing of data may be conducted in some different levels depending on the difference of the compression rate. In the present preferred embodiment, compression at a small compression rate is carried out in the first compressing operation. This is because image data of as high quality as possible can be sent in consideration that the attachment file is image data.

After completion of the first compression, it is determined again whether or not the data size of the send mail is not more than the unsendable size (step S182). If the data size is not less than or equal to the unsendable size again, compression at a larger compression rate than the first compression is carried out (step S183). In this manner, compression is repeated while increasing the compression rate until the data size becomes less than or equal to the unsendable size.

In the case where the data size of the send mail is not more than the unsendable size ("Yes" in step S182), the mail controlling section 83 determines whether or not the data size of the send mail is not more than the sendable size (step S184). At this time, if the data size of the send mail is not more than the sendable size ("Yes" in step S184), it has been proved that the mail can be sent securely, and so the send mail is sent after the compressed image data 53 is attached thereto (step S186).

In the case where the data size of the send mail is larger than the sendable size ("No" in step S184), the updating section 84 records a record with regard to that send mail in the memory table 52 (step S 185). To be more specific, a message ID, a destination electronic mail address, a send size and a send time are recorded. The message ID is an ID uniquely assigned to the send mail, and is used for identification with the return error mail later.

For example, in the case where the size of the send mail to the recipient B (yamada@aaa.com) is 1.2 M which is larger than the sendable size (1.0 MB) and smaller than the unsendable size (1.5 MB), a message ID (434-J11056), a send size (1.2 MB) and the like are recorded as shown in FIG. 5.

Such a record is recorded in the memory table 52 because at this point of time, it is impossible to determine the send mail of which data size is not less than the sendable size and not more than the unsendable size as being sendable, and using the result of this sending, it becomes possible to update the sendable size or the unsendable size.

After completion of recording to the memory table 52, the mail sending section 81 attaches the compressed image data 53 to the send mail and sends it (step S186). This completes the sending process and the flow returns to a state of waiting a designation for main process.

Furthermore, in step S182, in the case where it is determined to be not more than the unsendable size at the first determination without carrying out compression (step S1182), the following process is executed.

A determination whether or not it is not more than the sendable size is made (step S184), and in the case where it is not more than the sendable size, the image data 53 is attached to the send mail without being compressed and the send mail is sent (step S186). To the contrary, in the case where it exceeds the sendable size, after recording into the memory table 52 (step S185), the image data 53 is attached to the send mail without being compressed and the send mail is sent (step S186). <4-2. Receiving Process>

Next, a receiving process of electronic mail in the MFP 1 will be explained with reference to the flow charts of FIGS. 9 to 12.

There are two ways in the receiving process of electronic mail: a way in which reception mails are checked in a desired timing (in other words, a random timing) by making a predetermined operation in the operational section 11 and a way in which reception mails are regularly checked, however, the procedure of process is the same in these ways except for a trigger of receiving process. In this description, explanation is made while taking the case where reception mails are regularly checked as an example.

Figure 9:
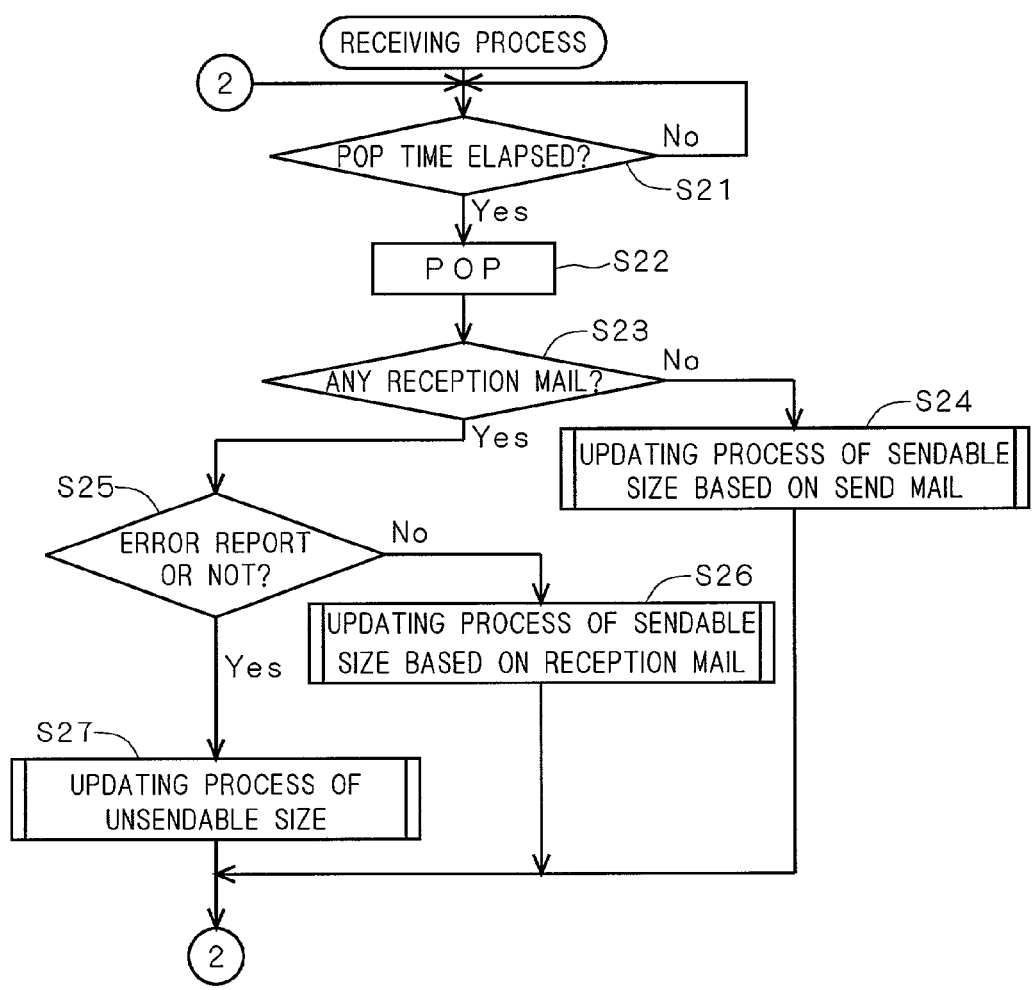
FIG. 9 is a flow chart of a receiving process.

FIG. 9 is a main flow chart of the receiving process. The receiving process operates at a predetermined time interval (POP time interval) asynchronously with the mail sending process and the like. As the POP time has elapsed ("Yes" in step S21), the mail receiving section 82 acquires a reception mail from the mail server 5A (step S22). In the case where there is no reception mail ("No" in step S23), an update process of sendable size is carried out based on the send mail (step S24).

Figure 10:
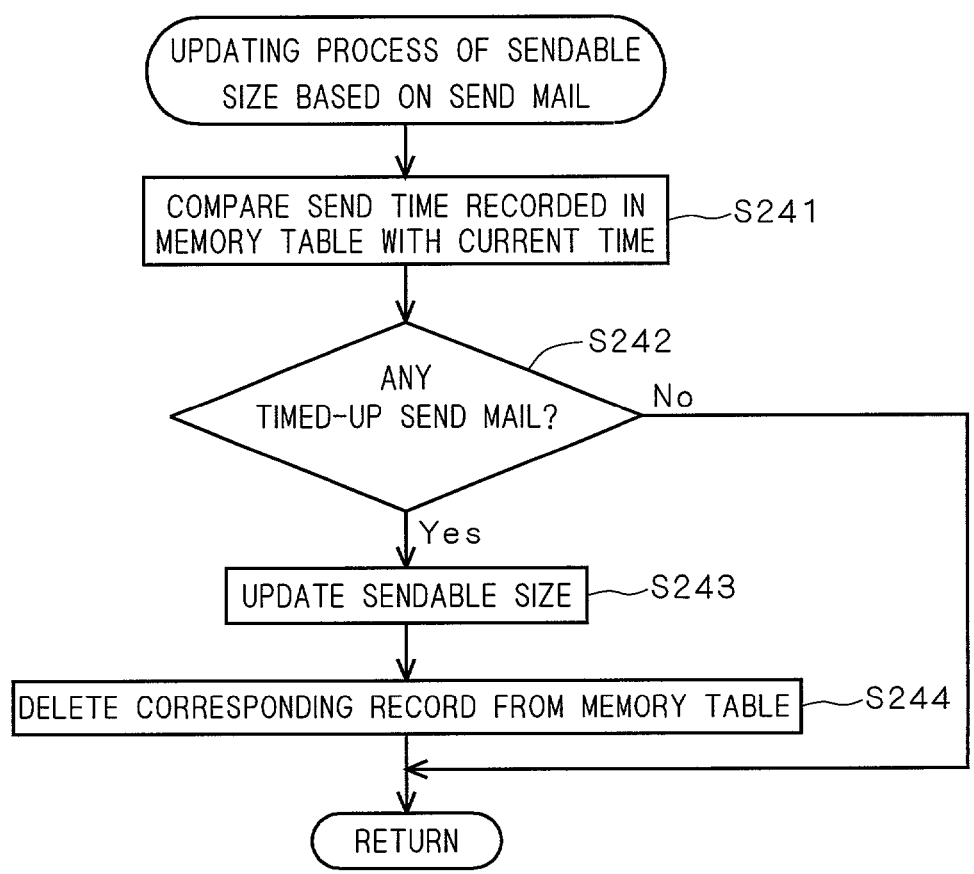
FIG. 10 is a flow chart of an update process of sendable size in accordance with a send mail.

FIG. 10 is a flow chart of an update process of sendable size in accordance with send mail. This process is a process for determining whether or not the send mail recorded into the memory table 52 in the previous sending process as described above has been successfully sent.

The updating section 84 compares the send time recorded in each record of the memory table 52 with the current time with reference to the memory table 52 (step S241). Then, it determines whether or not a send mail that has been timed up (step S242). The determination of time-up is by checking whether or not a predetermined time has elapsed. "Predetermined time" is a time for determining that the send mail has been successfully sent if an error mail has not been sent back within a certain period of time.

In the case where there is no send mail that has been timed-up ("No" in step S242), the process ends to return to the main flow of the receiving process as shown in FIG. 9.

In the case where there is a send mail that has been timed-up ("Yes" in step S242), the updating section 84 updates the sendable size with the data size of that send mail (step S243). That is, since the record stored in the memory table 52 concerns a send mail of the size not less than the sendable size, when it is determined that the send mail has been successfully sent, it means that the send mail having a data size which is larger than the sendable size registered in the address table 51 succeeded to be sent. Then, a record that has been timed-up is deleted from the memory table 52 (step S244), and the flow returns to the main flow of the receiving process.

Again, the main flow of the receiving process in FIG. 9 is referred. When a reception mail is checked in step S23, the mail receiving section 82 determines whether or not the reception mail is an error mail (step S25). "Error mail" means an electronic mail that the mail server 5A or the mail server 5B sent so as to notify that an electronic mail sent by the sender A cannot be sent. In the case where the reception mail is not an error mail ("No" in step S25), an update process of sendable size in accordance with the reception mail is carried out (step S26).

Figure 11:
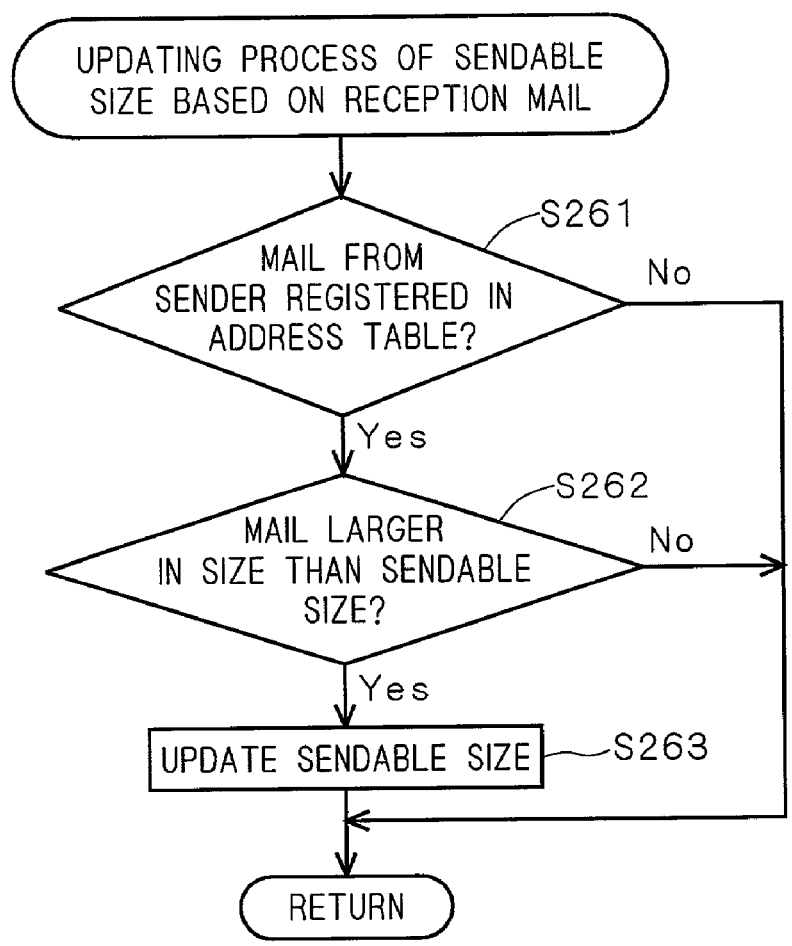
FIG. 11 is a flow chart of an update process of sendable size in accordance with a reception mail.

FIG. 11 is a flow chart showing an update process of sendable size in accordance with the reception mail.

In the case where the reception mail is not an error mail, namely, a normal electronic mail was received, the mail receiving section 82 determines whether or not the electronic mail address of the sender of the reception mail is registered in the address table 51 (step S261). In the case where the electronic mail address is not registered in the address table 51 ("No" in step S261), the process ends to returns to the main flow of the receiving process.

In the case where the electronic mail address of the sender of the reception mail is registered in the address table 51 as a destination electronic mail address ("Yes" in step S261), whether or not the data size of the reception mail is larger than the sendable size registered in the address table 51 (step S262). In the case where the data size of the reception mail is smaller than the sendable size ("No" in step S262), the process ends to return to the main flow of the receiving process.

And, in the case where the data size of the reception mail is larger than the sendable size ("Yes" in step S262), an update process for recording the data size of the reception mail as a new sendable size is carried out (step S263). In this manner, also in the case where the data size of the electronic mail that has been successfully received is larger in size than the sendable size with regard to the sender thereof, by updating the sendable size, it is possible to improve the reliability of the size information. After completion of the update process of sendable size, the flow returns to the main flow of the receiving process.

The main flow of the receiving process of FIG. 9 will be referred again. In step S25, in the case where the mail receiving section 82 determines that the reception mail is an error mail ("Yes" in step S25), an update process of unsendable size starts (step S27).

Figure 12:
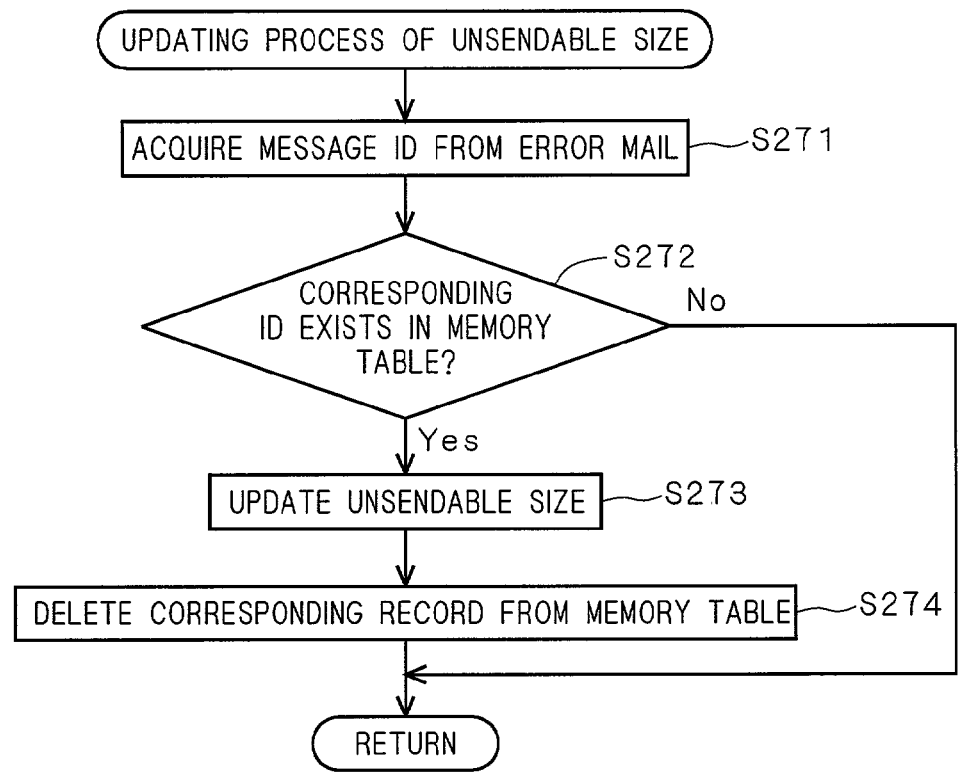
FIG. 12 is a flow chart of an update process of unsendable size.

FIG. 12 is a flow chart of an update process of unsendable size.

As the mail receiving section 82 receives an error mail, the updating section 84 acquires a message ID from the error mail (step S271). There can be a case that a message ID of the send mail is contained in the text of the error mail, or a case that a message ID of the send mail is contained in header information of the error mail. The updating section 84 can deal with these several patterns, and acquires a message ID by searching the text or header information of the error mail.

Upon acquiring a message ID, the updating section 84 determines whether or not a record containing the message ID exists in the memory table 52 (step S272). In the case where such a record does not exist in the memory table 52 ("No" in step S272), the process ends to return to the main flow of the receiving process.

In the case where such a record exists in the memory table 52 ("Yes" in step S272), the update section 84 records the data size of the send mail as a new unsendable size (step S273). That is, in the sending process, the control is executed so that the data size of the send mail is not more than the unsendable size, so that if the error mail is sent back, it means that an electronic mail of which data size is not more than the unsendable size was impossible to be sent. After updating the unsendable size, the updating section 84 deletes the corresponding record from the memory table 52 (step S274) to return to the main flow of the receiving process.

In the manner as described above, the MFP 1 according to the present preferred embodiment updates and manages the sendable size and the unsendable size for each destination electronic mail address, so that a sender can refer the size information displayed on the display section 12 to use it as a guide in sending a mail. Furthermore, as for the send mail which is larger in size than the unsendable size, the mail controlling section 83 performs compression, the sender need not adjust the data size of the send mail, so that operational labor in sending a mail can be reduced.

(5. Adjustment of Unsendable Size)

The unsendable size recorded in the address table 51 is a data size of an electronic mail which is determined to be impossible to be sent. In the above preferred embodiment, since an electronic mail sent from the MFP 1 is compressed in the mail controlling section 83, and thus the size of the electronic mail is necessarily not more than the unsendable size, even in the case where the environment changes, for example, throughput of the mail server improves, the control of data size is executed in correspondence with the previous throughput. In addition, there is a possibility that an error mail will be sent back with respect to a send mail of the data size that could be successfully sent because of a fault in the mail server and the like. Therefore, it is desired to provide a function such that the unsendable size is reviewed at a certain timing.

Figure 13:
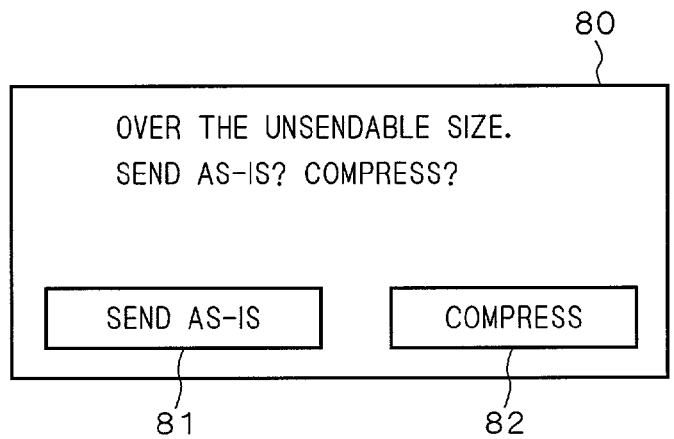
FIG. 13 is a view showing one example of a warning message.

One way for achieving this is to add a function of sending a send mail of the size which is not less than the unsendable size by an intention of a sender. For instance, while when it is determined to be not less than the unsendable size in the step S182 shown in FIG. 8, compression is necessarily performed, a warning message 80 (illustrated in FIG. 13) such as "This mail exceeds the unsendable size. Send in this size? or Compress?" may be displayed on the display section 12.

And, in the case where a button 81 representing "Send in this size" is selected by an intention of the sender, the send mail of the size which is not less than the unsendable size is sent. In the case where a button 82 representing "Compress" is selected by an intention of the sender, the compression is executed in accordance with the above-described flow.

As a result of this, when an electronic mail of the size which is not less than the unsendable size is sent and this mail is successfully sent, it is possible to update the unsendable size (in this case, together with the sendable size).

In another way, it is also effective to provide a threshold for the unsendable size. For example, it is so configured that the unsendable size should not be set 500 KB or less. Consequently, when an error mail is sent back with respect to a send mail whose data size is extremely small because of a fault in the mail server or the like, it is possible to prevent the unsendable size from becoming too small.

(6. Modification)

In the present preferred embodiment, the MFP 1 manages both of the size information of the sendable size and the unsendable size, thereby achieving smoother mail sending control. However, a preferred embodiment of managing either one of the size information may be possible.

The preferred embodiment of managing only the sendable size is effective in that the data size that ensures success mail sending can be represented to the sender. On the other hand, the preferred embodiment of managing only the unsendable size is effective in that the data size in which sending is impossible can be represented to the sender so as to avoid repeating the same failure.

Furthermore, in the present preferred embodiment, an attachment file (image data) is compressed when the data size of the send mail is not less than the unsendable size, however, the control may be performed so as to divide the send mail into a plurality of send mails so that each send mail thus divided has a data size which is not more than the unsendable size.

Furthermore, in the present preferred embodiment, the explanation was made while taking the MFP as an example, however, the present invention may be applicable to any apparatuses insofar as they can send an electronic mail. For example, the present invention can be applied to a personal computer in which a general electronic mail software program is installed. Furthermore, the present invention may be applied to an electronic mail software program itself.

Furthermore, such a program is available in the condition that it is recorded on a variety of recording media such as memory card or CD-ROM. The electronic mail sending apparatus (for example, personal computer) reads the program recorded on such a recording medium and executes the program by using a CPU or the like in the apparatus, thereby achieving the above-mentioned various functions. Furthermore, the electronic mail sending apparatus may take such a program into the apparatus by downloading the program from a predetermined server or the like via a network.

The present invention may be embodied by either a computer system controlled in accordance with software programs or a hardware system having individual hardware elements for conducting the respective steps as described in the preferred embodiments. Both of the software elements and the hardware elements are included in the terminology of "devices" which are elements of the system according to the present invention.

While the invention has been described in detail, the foregoing description is in all aspects illustrative and not restrictive. It is therefore understood that numerous other modifications and variations can be devised without departing from the scope of the invention.

What is claimed is:

1. An apparatus for sending an electronic mail via a network, the apparatus comprising:
   a sending device operable to send an electronic mail;
   a storing device for storing a relational information representing correlation between data size of respective electronic mails and transmittance results of said respective electronic mails for each mail-designation, wherein said relational information includes an unsendable threshold corresponding to a minimum data size among electronic mails whose transmission has failed;
   an updating device for updating said relational information in response to a mail-sending history of electronic mails; and
   a controlling device for controlling said sending device in response to said relational information.

2. The apparatus according to claim 1, wherein said relational information includes:
   a sendable threshold corresponding to a maximum data size among electronic mails whose transmission have been successful.

3. The apparatus according to claim 1, wherein said controlling device compresses the data of a new electronic mail to be sent when a data size of said new electronic mail is larger than said unsendable threshold.

4. The apparatus according to claim 3, wherein said controlling device compresses the data of the new electronic mail so that the data size of said new mail after compression is not more than said unsendable threshold.

5. The apparatus according to claim 1, wherein said controlling device generates a warning when a data size of a new electronic mail to be sent is larger than said unsendable threshold.

6. The apparatus according to claim 2, wherein said updating device updates said sendable threshold to a data size of a new electronic mail that has been successfully transmitted, when the data size of said new electronic mail is larger than said sendable threshold before updating.

7. The apparatus according to claim 1, wherein said updating device updates said unsendable threshold to a data size of a new electronic mail whose transmission has failed, when the data size of said new electronic mail is smaller than said unsendable threshold before updating.

8. The apparatus according to claim 2, wherein, when a transmission error mail which is sent by a mail server in a mail transmission passage contains a transmittable threshold information regarding a data size of an electronic mail that said mail server can process, said updating device updates said sendable threshold in response to said transmittable threshold information.

9. The apparatus according to claim 1, further comprising:
   a displaying device for displaying said relational information for a mail-destination of a new electronic mail to be sent in response to designating operation of said mail-destination of said new electronic mail.

10. An apparatus for sending an electronic mail via a network, the apparatus comprising:
    an image inputting device for inputting an image;
    a sending device operable to send an electronic mail to which said image is attached;
    a storing device for storing a relational information representing correlation between data size of respective electronic mails and transmittance results of said respective electronic mails for each mail-designation, wherein said relational information includes an unsendable threshold corresponding to a minimum data size among electronic mails whose transmission has failed;
    an updating device for updating said relational information in response to a mail-sending history of electronic mails; and
    a controlling device for controlling said sending device in response to said relational information.

11. A method for controlling the sending of electronic mail via a network, the method comprising the steps of:
    storing, in a storage device, a relational information representing correlation between data size of respective electronic mails and transmittance results of said respective electronic mails for each mail-designation, wherein said relational information includes an unsendable threshold corresponding to a minimum data size among electronic mails whose transmission has failed;
    updating said relational information in response to a mail-sending history of electronic mails; and
    controlling sending of a new electronic mail in response to said relational information.

12. A computer program stored in a computer readable storage media which, when read and executed by a computer included in an electronic mail terminal, causes the electronic mail terminal to perform the functions of:
    a sending device operable to send an electronic mail;
    a storing device for storing a relational information representing correlation between data size of respective electronic mails and transmittance results of said respective electronic mails for each mail-designation, wherein said relational information includes an unsendable threshold corresponding to a minimum data size among electronic mails whose transmission has failed;
    an updating device for updating said relational information in response to a mail-sending history of electronic mails; and
    a controlling device for controlling said sending device in response to said relational information.

13. The computer program according to claim 12, wherein said relational information includes:
    a sendable threshold corresponding to a maximum data size among electronic mails whose transmission have been successful.

14. The computer program according to claim 12, wherein said electronic mail terminal, when caused to function as a controlling device, compresses the data of a new electronic mail to be sent when a data size of said new electronic mail is larger than said unsendable threshold.

15. The computer program according to claim 14, wherein said electronic mail terminal, when caused to function as a controlling device, compresses the data of the new electronic mail so that the data size of said new mail after compression is not more than said unsendable threshold.

16. The computer program according to claim 12, wherein said electronic mail terminal, when caused to function as a controlling device, generates a warning when a data size of a new electronic mail to be sent is larger than said unsendable threshold.

17. The computer program according to claim 13, wherein said electronic mail terminal, when caused to function as an updating device, updates said sendable threshold to a data size of a new electronic mail that has been successfully transmitted, when the data size of said new electronic mail is larger than said sendable threshold before updating.

18. The computer program according to claim 12, wherein said electronic mail terminal, when caused to function as an updating device, updates said unsendable threshold to a data size of a new electronic mail whose transmission has been failed, when the data size of said new electronic mail is smaller than said unsendable threshold before updating.

19. The computer program according to claim 13, wherein, when a transmission error mail which is sent by a mail server in a mail transmission passage contains a transmittable threshold information regarding a data size of an electronic mail that said mail server can process, said electronic mail terminal, when caused to function as an updating device, updates said sendable threshold in response to said transmittable threshold information.

20. The computer program according to claim 12, wherein the electronic mail terminal further comprises a displaying device for displaying said relational information for a mail-destination of a new electronic mail to be sent in response to designating operation of said mail-destination of said new electronic mail.

21. The computer program according to claim 12, wherein said sending device sends an electronic mail attached with image data.

22. A computer-readable recording medium recording a computer program which, when read and executed by a computer included in an electronic mail terminal to obtain an electronic mail terminal for sending an electronic mail, causes the electronic mail terminal to perform the functions of:
  a sending device operable to send an electronic mail;
  a storing device for storing a relational information representing correlation between data size of respective electronic mails and transmittance results of said respective electronic mails for each mail-designation, wherein said relational information includes an unsendable threshold corresponding to a minimum data size among electronic mails whose transmission has failed;
  an updating device for updating said relational information in response to a mail-sending history of electronic mails; and
  a controlling device for controlling said sending device in response to said relational information.

23. An apparatus for sending an electric mail, comprising:
  a mail sending module operable to send an electronic mail; and
  a controller operable to find a new electronic mail having data size larger than a threshold size,
  wherein said threshold size represents an unsendable threshold corresponding to a minimum data size among electronic mails whose transmission has failed and is updated in response to transmission results of electronic mails having been sent from said mail sending module.

24. The apparatus of claim 23, wherein said controller is operable to gate said new electronic mail having the data size larger than said threshold size.

25. The apparatus of claim 23, wherein said controller is operable to compress the data size of said new electronic mail.

26. The apparatus of claim 23, wherein said controller is operable to generate a warning for said new electronic mail having the data size larger than said threshold size.

27. The apparatus of claim 23, wherein said controller comprises:
  a storage storing a value representing said threshold size,
  an error process module operable to conduct a predetermined error action when said data size of said new electronic mail is larger than said threshold size, and
  an updating module capable of updating said threshold size in response to said transmission results.

28. The apparatus of claim 27, wherein said value representing said threshold size is stored and updated for each designation address of electric mails.

29. The apparatus of claim 28, wherein said value representing said threshold size is updated in response to a transmission error report which is sent from a network node having received an untransmittable electronic mail from said mail sending module.

* * * * *